United States Patent
Yang et al.

(10) Patent No.: US 8,755,613 B2
(45) Date of Patent: Jun. 17, 2014

(54) METHOD FOR MEASURING FLICKER

(75) Inventors: Hua Yang, Princeton, NJ (US); Alan Jay Stein, Princeton Junction, NJ (US); Gad Moshe Berger, Dayton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 213 days.

(21) Appl. No.: 12/735,411

(22) PCT Filed: Jan. 7, 2009

(86) PCT No.: PCT/US2009/000060
§ 371 (c)(1),
(2), (4) Date: Jul. 14, 2010

(87) PCT Pub. No.: WO2009/091503
PCT Pub. Date: Jul. 23, 2009

(65) Prior Publication Data
US 2011/0052084 A1    Mar. 3, 2011

Related U.S. Application Data

(60) Provisional application No. 61/011,507, filed on Jan. 17, 2008.

(51) Int. Cl.
*H04N 5/217*    (2011.01)
(52) U.S. Cl.
USPC . 382/221; 382/232; 375/240.26; 375/E7.147; 375/E7.181; 375/E7.19
(58) Field of Classification Search
USPC .......... 382/221; 375/240.26, E7.147, E7.167, 375/E7.181, E7.19
See application file for complete search history.

(56) References Cited

U.S. PATENT DOCUMENTS

| | | |
|---|---|---|
| 6,714,191 B2 | 3/2004 | Wu et al. |
| 7,218,777 B2 | 5/2007 | Asano et al. |
| 2004/0165084 A1 | 8/2004 | Yamamoto et al. |
| 2005/0018920 A1 | 1/2005 | Ramamurthy |

(Continued)

FOREIGN PATENT DOCUMENTS

| | | |
|---|---|---|
| EP | 0936810 B1 | 8/2006 |
| JP | 2005348008 | 12/2005 |

(Continued)

OTHER PUBLICATIONS

Becker et al., "Flicker Reduction in Intraframe Codecs", IEEE Computer Society, Proceedings of the Data Compression Conference (DCC'04), 1068-0314/04, 2004, IEEE.

(Continued)

*Primary Examiner* — Ruiping Li
(74) *Attorney, Agent, or Firm* — Robert D. Shedd; Richard LaPeruta

(57) ABSTRACT

A method for accurately measuring flicker, by first determining an original value based on a difference between pixel values in corresponding locations in a first picture and a second picture. Next, a reconstructed value is determined, based on a difference between pixel values in corresponding locations in a reconstruction from an encoding of the first picture and a reconstruction from an encoding of the second picture. Then, a determination is made to include a comparison value, which is determined on a difference between the reconstructed value and the original value, in a measurement of flicker between the first picture and the second picture.

7 Claims, 3 Drawing Sheets

(56) References Cited

U.S. PATENT DOCUMENTS

| | | |
|---|---|---|
| 2006/0061669 A1 | 3/2006 | Jang et al. |
| 2006/0158531 A1 | 7/2006 | Yanof |
| 2007/0025621 A1 | 2/2007 | Lee et al. |
| 2007/0036213 A1 | 2/2007 | Matsumura et al. |
| 2007/0046790 A1 | 3/2007 | Nakasuji et al. |
| 2008/0025397 A1* | 1/2008 | Zhao et al. ............... 375/240.13 |
| 2009/0046092 A1 | 2/2009 | Sato et al. |

FOREIGN PATENT DOCUMENTS

| | | |
|---|---|---|
| JP | 200749629 | 2/2007 |
| JP | 2007067469 | 3/2007 |
| JP | 2007214785 | 8/2007 |
| JP | 2009503999 | 1/2009 |

OTHER PUBLICATIONS

Chun et al., "Flicker Reduction in Intra Coded Frames of H.264/AVC", Korea University, 1-4244-0481-9/06, 2006 IEEE.

Hara et al., "Flicker Reduction Technique in MPEG-2 Video by Post-Processing", NHK Science & Technical Research Laboratories, 0-7803-883-0/05, Tokyo, Japan, 2005, IEEE.

Pandel, "Measuring of Flickering Artifacts in Predictive Coded Video Sequences, Ninth International Workshop on Image Analysis for Multimedia Interactive Services", 978-0/7695-3130-4/08, 2008 IEEE.

Search Report Dated Feb. 20, 2009.

* cited by examiner

METHOD FOR MEASURING FLICKER

CROSS-REFERENCE TO RELATED APPLICATIONS

This application claims the benefit, under 35 U.S.C. §365 of International Application PCT/US09/00060, filed Jan. 7, 2009, which was published in accordance with PCT Article 21(2) on Jul. 23, 2009 in English and which claims the benefit of U.S. provisional patent application No. 61/011,507, filed Jan. 17, 2008.

FIELD OF THE INVENTION

The present invention relates to a method for measuring flicker, and particularly relates to a method that can accurately measure per-frame flickering artifacts.

BACKGROUND OF THE INVENTION

Inter-frame flickering is a commonly seen artifact in encoded video signals, especially at periodic I-frames in low or medium bit rate coding, which greatly degrades the overall perceptual quality of the coded video. How to accurately measure the flickering artifact is an important issue in practice. Existing flicker metrics are typically rough solutions suitable only for measuring I-frame flickering of the whole sequence to provide a single measure of I-frame flicker that is descriptive of the whole sequence, and fail when measuring a per-frame flickering artifact (that is, they fail to provide a single measure for a given frame).

Inter-frame flickering is a commonly seen artifact in video coding, as well. Although they are visually identical in the original video signal, the same static background areas in two consecutive video frames may look different in the encoded/reconstructed video. This is because the areas are encoded through different encoding processes with different coding parameters, for example, different macro-block (MB), quantization parameters (QP), and/or different MB coding modes (such as the Inter or Intra mode). Consequently, flickering will be perceived when playing out the coded video.

Flickering is more easily perceived in static or low motion areas of video frames than in medium or high motion areas, because of the well-known motion masking effect of human visual systems (HVS). In addition, flickering is more prominent in low or medium bit rate coding and/or at periodic I-frames in a coded sequence. While the previous frame is coded as a P-frame using inter-frame prediction, the current frame is coded as an I-frame with all the MBs, using intra-frame prediction. Coarse quantization is often used due to limited bit rate. Accordingly, a large reconstruction difference may result for the corresponding static MBs collated in the two frames, and hence, a serious I-frame flickering or pulsing artifact may result. Flickering artifacts, especially I-frame flickering, greatly compromise the perceptual quality of coded video.

How to accurately measure the flickering artifact is an important issue in practice. A good method for measuring flickering would not only prove valuable to evaluate the performance of various de-flickering schemes, but also, perhaps more importantly, such a method can be exploited to develop various encoder optimization techniques to more effectively reduce flickering. For example, rate-distortion (RD) optimization is a commonly adopted framework in practice to make encoding decisions over a variety of coding options, for example, macro-block (MB), motion vector, and coding mode, etc. Conventional RD optimization only considers the distortion between the reconstructed video and the original video. To reduce flickering, and hence, improve perceptual video coding quality, one can further introduce the flickering distortion in RD optimizations.

A widely used method to measure flicker is the so-called S metric, which measures the overall I-frame flickering artifact of an entire coded video sequence. It is defined as follows.

$$D_{Flicker,I} = \frac{1}{M \cdot N_{static\_MBs}} \sum_{1-frames:n} \sum_{static\ MBs:i} \sum_{pixels:j} |\hat{f}^j_{n,i} - \hat{f}^j_{n-1,i} - (f^j_{n,i} - f^j_{n-1,i})| \quad (1)$$

Herein, the concerned frames involve all the non-scene-change I-frames in a sequence. That is, frame n denotes a non-scene-change I-frame and frame n−1 is the frame played out before frame n. Note that scene-change I-frames are excluded, as flickering typically only occurs for frames in the same scene. Additionally, $f^j_{n,i}$ and $\hat{f}^j_{n,i}$ denote the original and the reconstructed pixel j of MB i in frame n, respectively. M denotes the total number of pixels in a MB, and $N_{static\_MBs}$ denotes the total number of static MBs in all the non-scene-change I-frames. Flickering is assumed to occur only on static MBs, which is defined as follows.

MB i in frame n is a static MB, if its mean-absolute-difference (MAD) is small, that is:

$$MAD_{n,i} = \frac{1}{M} \sum_{pixels:j} |f^j_{n,i} - f^j_{n-1,i}| < \varepsilon. \quad (2)$$

In practice, parameter ε could be, for example, 10. Note that instead of MAD, (1) and (2) can also be defined based on another measure, such as, for example, mean-square-difference (MSD) with parameter ε set to, for example, 500.

The S metric has been widely used to evaluate the performance of various I-frame de-flickering schemes. However, in practice, via experiments, the S metric is actually a fairly rough model. For example, it is only applicable to measure the overall I-frame flickering of an entire sequence, and fails when applied to generally measure flickering of each single frame. Note that the S metric is intended to be applied to a sequence, as evidenced by the summation in Equation 1 over a set of I frames. Removing that summation results in a metric that provides a result on a per-frame basis, but that result is not reliable as discussed below.

One fundamental defect of the metric is that using $|\hat{f}^j_{n,i} - \hat{f}^j_{n-1,i} - (f^j_{n,i} - f^j_{n-1,i})|$ to measure flicker at each pixel is only accurate if $|f^j_{n,i} - f^j_{n-1,i}|$ is small (for example, less than 10). However, even with a small MAD for the entire MB, $|f^j_{n,i} - f^j_{n-1,i}|$ of some particular pixels could be large (for example, around 100). In this case, small $|\hat{f}^j_{n,i} - \hat{f}^j_{n-1,i}|$ pixels which actually render little flickering, will lead to large $|\hat{f}^j_{n,i} - \hat{f}^j_{n-1,i} - (f^j_{n,i} - f^j_{n-1,i})|$, that is, large flickering distortion in the metric. This contradicts the actual viewing experience, and compromises the accuracy of the flickering model. As an example, FIG. 1 shows the result of applying Equation (1) to measure the per-frame flickering artifact (by removing the summation over a set of I-frames). FIG. 1 shows flickering distortion along the vertical axis 20 versus frame number along the horizontal axis 10 using an existing flickering metric. The sequence is the 150 frames CIF sequence "Bus" with 30 f/s, and coded at 300 kb/s with 30 frames per group-of-picture (GOP). All the non-scene-change I-frames are marked out with circles 30, and the rest of the frames are all P-frames. Visually, significant flickering is observed at the indicated I-frames, while little flickering at the P-frames. However, as seen in FIG. 1, the existing metric fails to truthfully reflect that difference.

Another drawback of the existing metric is that the static MBs are MBs at exactly the same location in the two consecutive frames. That is, no motion compensation is involved. However, a flickering artifact may be perceivable not only at completely static areas, but also at low motion areas. Hence, low motion MBs should also be included in the flickering distortion calculation. However, without motion compensation, even very low motion MBs may have a large inter-frame MB difference. Thus, such low motion MBs are inappropriately excluded from the calculation, which also compromises the accuracy of the metric.

SUMMARY OF THE INVENTION

A method is provided that can accurately measure flicker of each single frame all the time, and outperforms the known techniques. The method can be generally applied for accurate perceptual quality evaluation and development of effective flicker reduction schemes. The method for measuring flicker first determines an original value based on a difference between pixel values in corresponding locations in a first picture and a second picture. Next, a reconstructed value is determined, based on a difference between pixel values in corresponding locations in a reconstruction from an encoding of the first picture and a reconstruction from an encoding of the second picture. Then, a determination is made to include a comparison value, which is determined on a difference between the reconstructed value and the original value, in a measurement of flicker between the first picture and the second picture.

BRIEF DESCRIPTION OF THE DRAWINGS

The invention will be explained in greater detail in the following with reference to embodiments, referring to the appended drawings, in which.

DETAILED DESCRIPTION OF THE INVENTION

Figure 1:
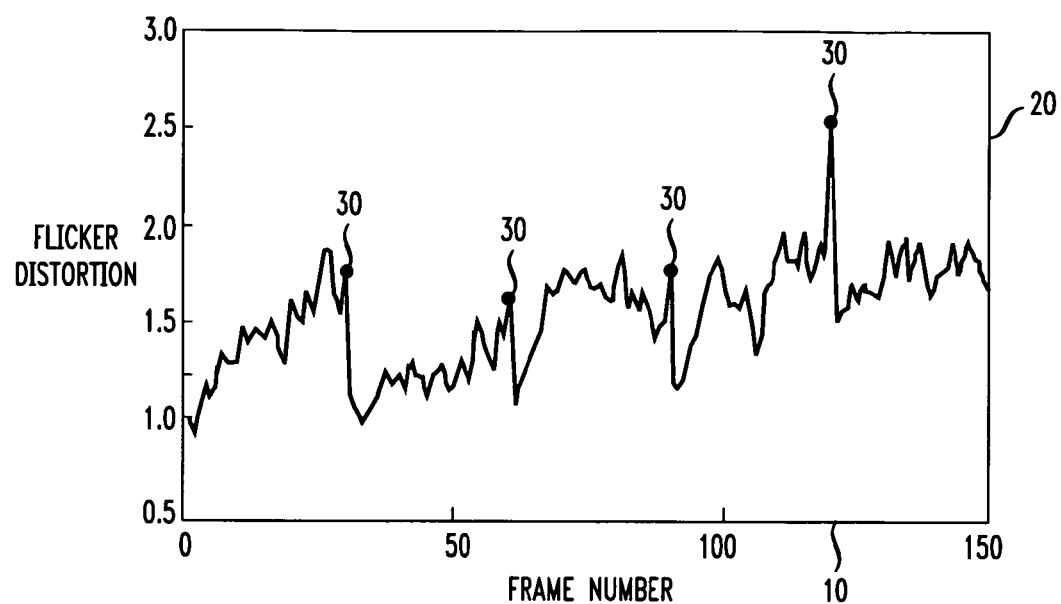
FIG. 1 is a graphical representation of the flickering distortion against frame number when using a well-known flickering metric.

The invention will now be described in greater detail. Reference will now be made in detail to the implementations of the present invention, which are illustrated in the accompanying drawings and equations.

In at least one implementation, a method to measure flicker is provided that accurately measures a per-frame flickering artifact, and renders better measuring performance than the existing S metric. Experiments show that the provided method accurately measures flickering of a frame, all the time. That is, the method accurately measures flickering on a frame basis (indeed, the method accurately measures flickering on a macro-block basis). The proposed reliable method can be generally applied for accurate perceptual quality evaluation or the development of effective flicker reduction techniques.

The proposed method, according to the invention and one implementation, is defined as follows. The flickering distortion of frame n is calculated as:

$$D_{Flicker,n} = \frac{1}{M \cdot N_{MBS}} \sum_{static\ MBs:i} \sum_{pixels:j} \max(0, |\hat{f}_{n,i}^j - \hat{f}_{n-1,i+mv}^j| - |f_{n,i}^j - f_{n-1,i+mv}^j|). \quad (3)$$

Herein, $N_{MBS}$ is the total number of static MBs in a given frame, mv denotes the motion vector (MV) of the MB, and MB i+mv of frame n−1 represents the motion compensation reference for MB i of frame n.

Similar to the existing method, S metric, besides absolute difference, the proposed method can also be based on other distortion measures, for example, squared difference.

There are at least three changes in the proposed method from the existing method, S metric. A "max" function is used, and the proposed method calculates the pixel differences differently. Further, the proposed method includes motion compensation, and is performed all the time, on a frame-by-frame basis. The existing method, S metric, includes measurement over a series of frames.

Comparing the existing model, as detailed in Equation (1), with the proposed model disclosed in Equation (3), a fundamental and important change is that flickering of a pixel is measured by $\max(0, |\hat{f}_{n,i}^j - \hat{f}_{n-1,i+mv}^j| - |f_{n,i}^j - f_{n-1,i+mv}^j|)$, as show in Equation (3). To isolate this change, the flickering of a pixel is not measured by $|\hat{f}_{n,i}^j - \hat{f}_{n-1,i+mv}^j| - (f_{n,i}^j - f_{n-1,i+mv}^j)|$, as would be predicted if you extended the S metric to include motion information. For now, the change is described in the form of the pixel-based flickering measurement rather than the adjustment for motion. In the proposed method, $|f_{n,i}^j - f_{n-1,i}^j|$ actually serves as a just-noticeable-difference (JND) threshold on flickering, below which it is assumed that no flickering will be perceived. It should be noted that motion information is included in the discussion for now, in order to isolate the pixel-based calculation.

It is evident that in the case of large $|f_{n,i}^j - f_{n-1,i}^j|$, the flickering masking JND threshold is also large. Thus, small $|\hat{f}_{n,i}^j - \hat{f}_{n-1,i}^j|$ will be masked out, and make no contribution to the overall flickering distortion. This is well correlated with the actual viewing experience, where small $|\hat{f}_{n,i}^j - \hat{f}_{n-1,i}^j|$ always represents smooth optical flow, and hence, little flickering artifact. This fundamental change allows the proposed method to provide superior in performance to the existing model, and hence, can be applied to accurately measure a frame-level flickering artifact of any individual frame, and not be limited to non-scene-change I-frames. Changes in the reconstructed images can be masked out of the distortion calculation if the underlying target image had at least as great a difference.

Figure 2:
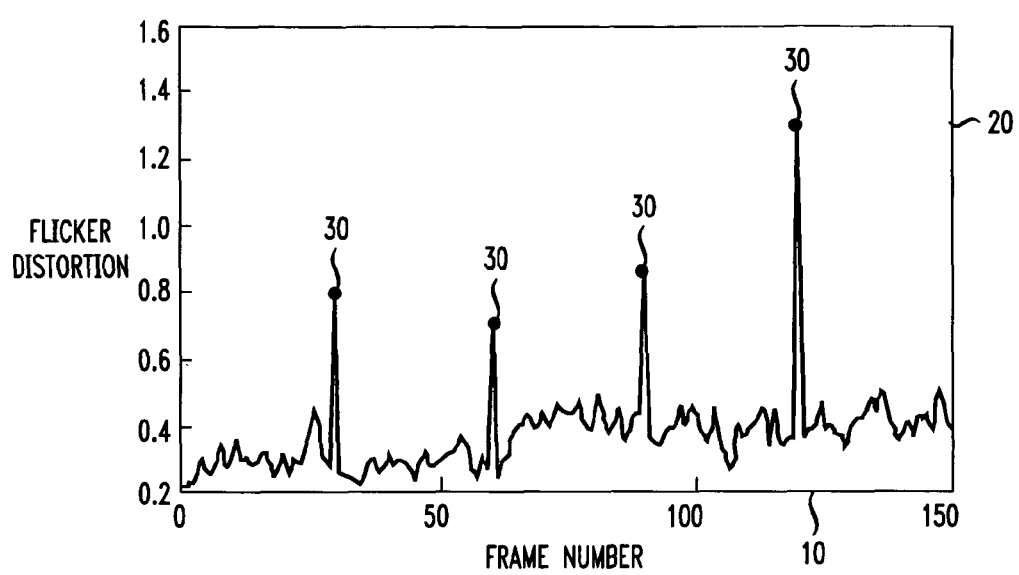
FIG. 2 is a graphical representation of the flickering distortion against frame number when using a proposed flickering metric without motion compensation.

As an example, FIG. 2 shows the per-frame flickering measurement result for the same sequence and coding settings as in FIG. 1. FIG. 2 shows flicker distortion along the vertical axis 20 versus frame number along the horizontal axis 10 using the flickering metric according to the invention. Again, the non-scene-change I frames are indicated with circles 30. FIG. 2 clearly shows that the proposed method properly detects the fact that at I-frames the flickering artifact is significantly more intense than at P-frames. Further, FIG. 2 shows an example of the measurement performed without motion compensation.

In the proposed method, the definition of static MBs also involves a certain degree of motion compensation, to account for the flickering artifact at completely static or low motion MBs. This will lead to more accurate flickering modeling performance. A static MB is defined as a MB with:

$$MAD_{n,i}(mv) = \frac{1}{M} \sum_{pixels:j} |f_{n,i}^j - f_{n-1,i+mv}^j| < \varepsilon. \quad (4)$$

Motion estimation is typically conducted over a limited search range (for example, within 3 pixels). Beyond that range, it is assumed that flickering will be all masked out by the high motion. In addition, in motion estimation, a sub-pixel MV search will generally yield much more accurate results than a full-pixel search, and hence, is generally more preferable in practice.

Superior performance of the proposed method for measuring flicker is also provided by using max(0, $|\hat{f}_{n,i}^j - \hat{f}_{n-1,i}^j| - |f_{n,i}^j - f_{n-1,i}^j|$) to calculate the per-pixel flickering artifact. Again, motion information has been removed to isolate the change in form. That is, even without including motion information, the proposed method provides superior performance to the existing method, the S metric. Using motion compensation further improves the modeling accuracy, although it does so generally at the price of increased computation complexity. Therefore, in practice, one can decide whether to use motion compensation or not based on the capability of the actual system. That is, one can determine for any given implementation whether or not the additional computation complexity is affordable and/or justified by the increased accuracy.

Due to the superior performance, the proposed method to measure flicker can be applied to develop effective flickering reduction techniques. For example, the method provides an accurate pixel-based metric calculation and so accurately measures flickering of each individual MB (as well as frame). Accordingly, the proposed method for measuring flicker can be integrated into the widely adopted RD optimization framework to optimize various coding parameters, such as, for example, MVs, quantization parameters, or MB coding modes, etc. In contrast, the existing flickering metric has been shown not to have enough modeling accuracy at a frame level, and so does have enough modeling accuracy at the MB level either., and therefore there is not well-suited to integration into standard RD optimization frameworks.

Figure 3:
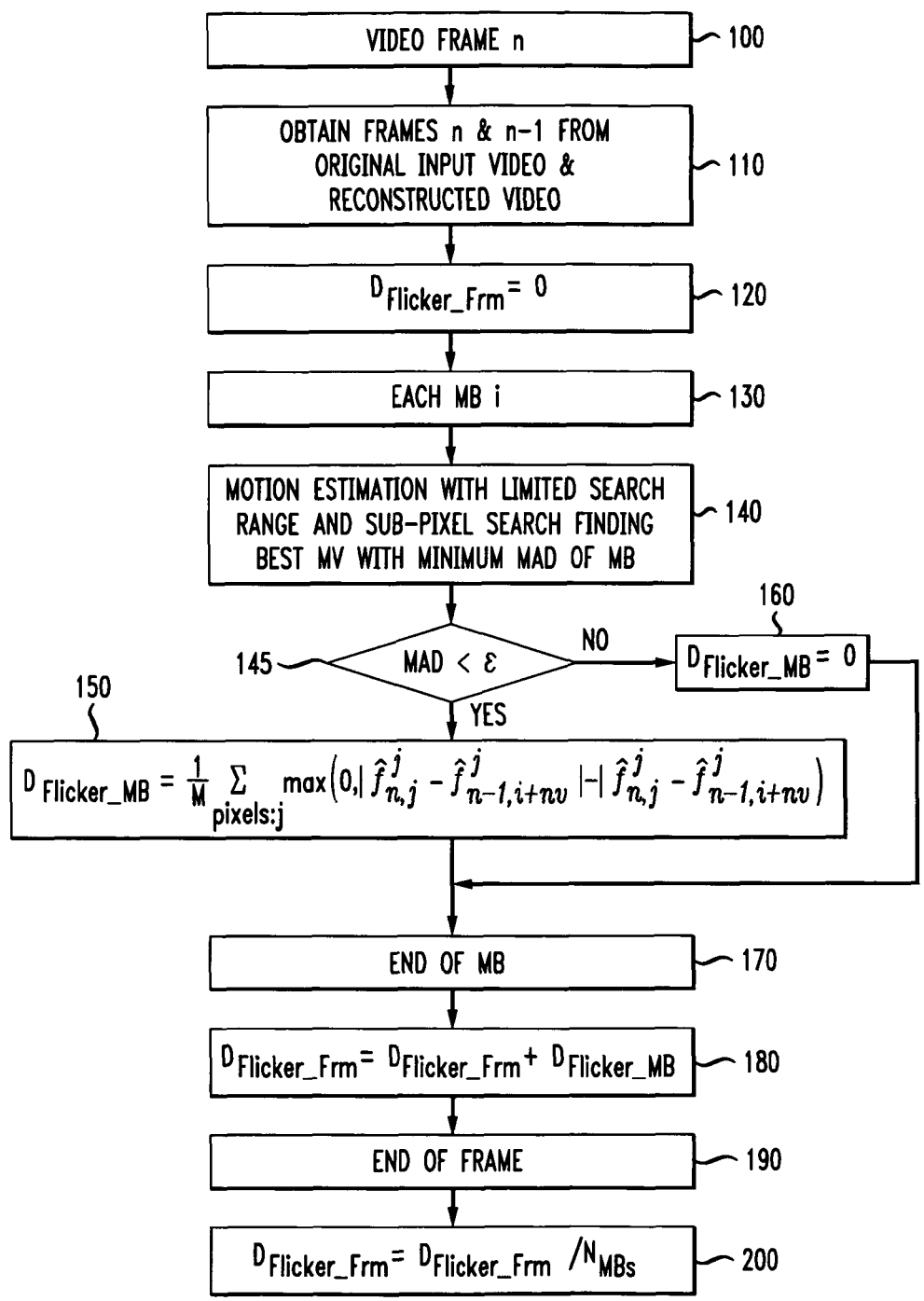
FIG. 3 is a flow diagram of the proposed per-frame flickering distortion metric.

FIG. 3 represents a calculation flowchart one embodiment of the proposed method for measuring flicker distortion per frame. Essentially, for each video frame n provided in block 100, the current frame n and the previous frame n−1 is retrieved from the original input video and the reconstructed video represented in block 110, wherein a per frame distortion metric $D_{Flicker\_Frm}$ is represented in block 120. For each macro block MB represented in block 130, motion estimation is conducted, which is represented in block 140, over a limited search range (i.e. within 3 pixels). This is followed by decision block 145. Beyond that range, it is assumed that flickering will be all masked out by the high motion. In addition, in motion estimation, a sub-pixel estimation is performed to find the best motion vector MV with minimum mean-absolute-difference MAD of the macro block MB. If the MAD is below a just-noticeable-difference (JND) threshold on flickering, then no flickering will be perceived consistent with block 160. However, if MAD is larger than the threshold, then a per-pixel flickering artifact is calculated block 150. The decision branch blocks 150, 160 are followed by the end of the macro block 170. This would be performed on a MB by MB basis, as well as a frame by frame basis, across the entire set of frames. Therefore, the proposed method can accurately measure flicker at one or more of (1) a pixel level (blocks 100-120), (2), an MB level (blocks 130-170), and (3) a frame level (blocks 180-200), across an entire video sequence.

One or more implementations are provided having particular features and aspects. However, features and aspects of described implementations may also be adapted for other implementations. For example, the described metric can be varied in different implementations in several ways. Some of these ways include, for example, adjusting the threshold in Equation 4, using a different metric in Equation 4 (such as, for example, one based on squared difference), or adjusting the "max" expression in Equation 3 to ignore differences that are not greater than a threshold. Although implementations described herein may be described in a particular context, such descriptions should in no way be taken as limiting the features and concepts to such implementations or contexts.

The implementations described herein may be implemented in, for example, a method or process, an apparatus, or a software program. Even if only discussed in the context of a single form of implementation (for example, discussed only as a method), the implementation or features discussed may also be implemented in other forms (for example, an apparatus or program). An apparatus may be implemented in, for example, appropriate hardware, software, and firmware. The methods may be implemented in, for example, an apparatus such as, for example, a computer or other processing device. Additionally, the methods may be implemented by instructions being performed by a processing device or other apparatus, and such instructions may be stored on a computer readable medium such as, for example, a CD, or other computer readable storage device, or an integrated circuit. Further, a computer readable medium may store the data values produced by an implementation.

As should be evident to one of skill in the art, implementations may also produce a signal formatted to carry information that may be, for example, stored or transmitted. The information may include, for example, instructions for performing a method, or data produced by one of the described implementations.

Additionally, many implementations may be implemented in one or more of an encoder, a pre-processor to an encoder, a decoder, or a post-processor to a decoder.

In an implementation (for example, a method or an apparatus or a set of instructions) of the invention, a method is provided that measures I-frame flicker that masks, from a distortion calculation, a difference in corresponding pixels in adjacent reconstructed pictures (or frames) if the difference is not greater than a corresponding difference in the underlying target images. Further, motion estimation is used to determine which pixels correspond to each other.

As should be evident to one of skill in the art, implementations may also produce a signal formatted for communicating the measurement of I-frame flicker.

Creating, assembling, storing, transmitting, receiving, and/or processing a measure of flicker according to one or more implementations described in this disclosure.

According to the invention, a device (such as, for example, an encoder, a decoder, a pre-processor, or a post-processor) has been considered that is capable of operating according to, or in communication with, one of the described implementations, as well as a device (such as, for example, a computer readable medium) for storing a measure of I-frame flicker according to an implementation described in this disclosure, or for storing a set of instructions for measuring I-frame flicker according to one or more of the implementations described in this disclosure.

Additionally, and according to the merits of the invention, a signal is considered that is formatted in such a way to include information relating to a measure of I-frame flicker, as described in this disclosure. The signal may be an electromagnetic wave or a baseband signal, wherein the information includes one or more of residue data, motion vector data, and reference indicator data.

Further, other implementations are contemplated by this disclosure. For example, additional implementations may be created by combining, deleting, modifying, or supplementing various features of the disclosed implementations. Additionally, the invention is intended to include a device or devices which can perform the methods disclosed above and which can apply the methods to reduce distortion.

The invention claimed is:

1. A method in a processor or video encoder of reducing distortion of video comprising the steps:
   determining an original value based on a difference between pixel values in corresponding locations in a first picture and a second picture;
   determining a reconstructed value based on a difference between pixel values in corresponding locations in a reconstruction from an encoding of the first picture and a reconstruction from an encoding of the second picture;
   determining a comparison value based on a difference between the reconstructed value and the original value, wherein the determining of the comparison value comprises performing $\max(0, |\hat{f}_{n,i}^{j} - \hat{f}_{n-1,i+mv}^{j}| - |f_{n,i}^{j} - f_{n-1,i+mv}^{j}|)$, where $f_{n,i}^{j}$ represents the original pixel j of macroblock i in frame n, $\hat{f}_{n,i}^{j}$ represents the reconstructed version of the same, and mv represents a motion vector; and
   determining, based on the comparison value, whether to include the comparison value in a measurement of flicker between the first picture and the second picture to diminish the contribution of comparison values that correspond to small amounts of perceptible flicker, wherein the comparison value is included in the measurement when the comparison value is greater than a just-noticeable-difference threshold.

2. The method of claim 1 wherein the original value equals an absolute value of the difference between pixel values in the corresponding locations in the first picture and the second picture.

3. The method of claim 2 wherein the reconstructed value equals an absolute value of the difference between pixel values in the corresponding locations in the reconstruction from the encoding of the first picture and the reconstruction from the encoding of the second picture.

4. The method of claim 3 wherein the comparison value equals the reconstructed value minus the original value.

5. The method of claim 1 comprising the step of determining whether to include the comparison value in a measurement of flicker and applying the measurement of flicker in a means for reducing flicker.

6. The method of claim 1 comprising the step of applying the measurement of flicker in a means for reducing flicker.

7. The method of claim 1, wherein the original value and reconstructed value each include motion compensation by finding a difference between pixel values in motion compensated macroblocks.

* * * * *